Patented July 16, 1940

2,207,890

UNITED STATES PATENT OFFICE 2,207,890

COMPOSITION OF MATTER AND METHOD OF PRODUCING

Edwin R. Littmann, Wilmington, Del., assignor to Hercules Powder Company, Wilmington, Del., a corporation of Delaware No Drawing. Application September 29, 1938, Serial No. 232,316

8 Claims. (Cl. 260—98)

This invention relates to new compositions of matter and methods of producing them. It relates more particularly to derivatives of dehydroabietic acid and to methods for their production.

In my co-pending application for United States Letters Patent, Serial No. 84,877, filed June 12, 1936, and now U. S. Patent No. 2,154,629 which is in turn a continuation-in-part of my application for United States Letters Patent, Serial No. 6,403, filed February 13, 1935, I described a process for treating rosin, rosin acids, or other compounds containing the hydrocarbon nucleus of a rosin acid with an active hydrogenation catalyst, such as nickel, copper chromite, platinum, palladium, etc., to produce a change in the chemical and physical properties of the rosin or rosin derivative, the resultant product having a greatly decreased unsaturation and in many cases a higher melting-point and improved properties. These changes in the physical and chemical characteristics of the material are believed to be due to an intra- and inter-molecular rearrangement of the hydrogen atoms occurring therein, with no change in the carbon skeleton. The process consists essentially of treating the rosin, rosin acid, or compound containing the hydrocarbon nucleus of a rosin acid with the active hydrogenation catalyst at an elevated temperature, the optimum range being from about 150° C. to about 250° C.

Further examination of the product of the above treatment of rosin compounds has led to the observation that it consists of a mixture of at least two types of chemical compounds, the major portion containing an aromatic ring, another portion being a saturated derivative of the rosin compound. I have separated from the product obtained by the treatment of a rosin acid the major portion consisting of an acid which I have identified as dehydroabietic acid, inasmuch as it appears to contain two less hydrogen atoms than abietic acid, contains one aromatic ring, and has the known physical constants of dehydroabietic acid as described in the literature. The dehydroabietic acid may be separated from the treated rosin by various means, crystallization from a solvent solution being a practical method.

Thus, by way of example, to 125 parts by weight of the product of the treatment of "I" wood rosin with a palladium catalyst under the conditions described in the application, Serial No. 84,877, filed June 12, 1936, now U. S. Patent No. 2,154,629 are added 170 parts by weight of acetone. After heating to effect solution the product is cooled and the crystals separating are removed by filtration, washed with cold acetone and dried. Successive concentrations of the mother liquor yield additional crystals, a total yield of about 73 parts by weight of the crystalline material being obtained. Solvents such as ethyl acetate, ethyl alcohol, methyl alcohol, petroleum ether, etc., may be used in place of acetone.

The crystalline, dehydroabietic acid isolated as above has been found to have the following characteristics:

| | |
|---|---|
| Melting point | 160–161° C. |
| Refractive index ($n_D^{20}$) | 1.5371 |
| Specific rotation | +60° |
| Neutral equivalent | 299.5 |
| Molecular weight | 300 |

It has been identified as having the following structural formula:

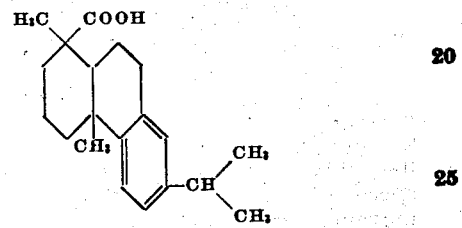

Other methods of preparing dehydroabietic acid have been described in the literature and the above structural formula has been accepted as representing the structure of the acid. However, some question exists concerning the exact location of the methyl and isopropyl groups. For the purpose of defining this invention these groups are located as shown.

In my co-pending application, Serial No. 226,438 filed August 24, 1938, I have described derivatives of dehydroabietic acid involving substitution in the carboxyl group. The derivatives are esters, salts, acyl halides, amides, ethers, primary alcohol, etc., which contain the hydrocarbon nucleus of dehydroabietic acid.

Now, in accordance with this invention, I may prepare sulfonic derivatives of dehydroabietic acid itself or compounds containing the hydrocarbon nucleus of dehydroabietic acid, in which the sulfonic groups are in the aromatic ring of the hydrocarbon nucleus of dehydroabietic acid. Thus, in general, the sulfonic derivatives which I may prepare will be sulfonation derivatives of dehydroabietic acid itself or of esters, salts, acyl halides, amides, ethers, primary alcohol, etc., derived from dehydroabietic acid and containing the hydrocarbon nucleus of dehydroabietic acid. The sulfonic derivatives may be neutralized to give salts of the corresponding sulfonic derivatives.

As a general expression of my invention the derivatives which I may prepare are expressed by the following general formula:

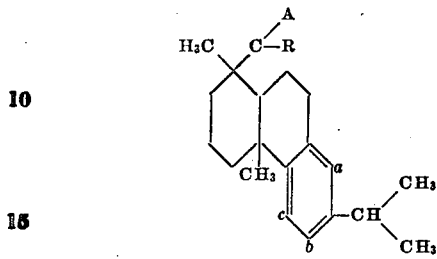

wherein A is a bivalent element or group such as O, S, H₂, NX, etc., where X is hydrogen or a monovalent organic radical; R is a monovalent element or group such as OH, SH, O-metal, O-NH₄, halogen, OX, SX, NXX, etc., where X is hydrogen or a monovalent organic radical; "a" and/or "b" and/or "c" are H, SO₃H or SO₃-metal groups. No more than two of the substituents "a," "b" and "c" may be hydrogen within the scope of this invention.

Thus, in general, the derivatives of dehydroabietic acid which I may prepare in accordance with this invention, may or may not be substituted in the carboxyl group and will be acids, esters, salts, acyl halides, amides, ethers, primary alcohols, etc., and will also be substituted in the aromatic nucleus of the dehydroabietic acid or compound containing the hydrocarbon nucleus of dehydroabietic acid, in one or more of the three possible positions with SO₃H, or SO₃-metal groups.

The sulfonic derivatives of dehydroabietic acid itself or compounds containing the hydrocarbon nucleus of dehydroabietic acid may be prepared by sulfonation with sulfonating agents such as sulfuric acid, chlorsulfonic acid, etc. The sulfonic acid derivative may then be neutralized with an alkaline material to yield salts of the sulfonic derivative, such as, for example, the sodium, potassium, calcium, etc., salts.

It is believed that substitution in the aromatic ring occurs principally at the "a" and "b" positions, but under certain specific conditions, it may be possible to obtain substitution at the "c" position. I am not able to designate in exactly which position substitution is obtained for the reason that to do so would require a very extensive research into the degradation products to give identifiable derivatives. In most instances, the exact location of the substituent group or groups is not of great importance, since the usefulness of the compounds would not be appreciably changed with the three different positions of the group or groups. I am able, however, to designate the number of groups which are introduced into the aromatic nucleus.

Substitution in the aromatic nucleus of dehydroabietic acid or a compound containing the hydrocarbon nucleus of dehydroabietic acid by the SO₃H or SO₃-metal groups may be performed on the dehydroabietic acid itself and the acid may then be treated by any of the known methods to replace the carboxyl group with any of the groups desired or the dehydroabietic acid may first be converted to a derivative of the acid containing the hydrocarbon nucleus of dehydroabietic acid and the resulting derivative treated to introduce the sulfonic group or groups into the aromatic nucleus.

As examples illustrating the preparation of derivatives of dehydroabietic acid in accordance with this invention, the following are cited:

Example 1

Fifteen parts by weight of dehydroabietic acid were added in small portions to about 50 parts by weight of 95 per cent sulphuric acid while maintaining a temperature of about 20°. The mixture was then poured into water, the sulfonic acid filtered off, extracted with water, and reprecipitated with hydrochloric acid. The sulfonic acid formed a dihydrate which had a neutral equivalent of 208. It may be dehydrated at 100° C. to give the anhydrous acid. The dihydrate produced as above has a sulphur content of 7.2 per cent, and contains one sulfonic group to the molecule. The calcium salt of the sulfonic acid is soluble in water.

Example 2

Fifteen parts by weight of dehydroabietic acid were added in small portions over a period of about 60 minutes to 25 parts by weight of 101% sulfuric acid while maintaining a temperature of about 0° to about 5° C. The mixture was then poured into water, the sulfonic acid filtered off, extracted with water, and reprecipitated with hydrochloric acid. The sulfonic acid was obtained in a yield of about 5 parts by weight and formed a dihydrate which had a neutral equivalent of 211. It may be dehydrated as in Example 1 to give the anhydrous acid. It contains one sulfonic group to the molecule.

Example 3

Thirty parts by weight of dehydroabietic acid were dissolved in about 150 parts by weight of carbon tetrachloride and the solution added to about 12 parts by weight of chlorosulfonic acid while maintaining a temperature of about 0° C. The crude sulfonic acid was then recovered by pouring the mixture into water, filtering, and extracting the precipitate with water as in the previous examples.

The new sulfonic acid derivatives may be used as wetting or dispersing agents either alone or in the form of their water soluble salts.

It will be understood that the details and examples hereinbefore set forth are for the purpose of illustration only and that the invention as herein broadly described and claimed is in no way limited thereby.

It will also be understood that the term dehydroabietic acid used herein in the examples and claims refers to the particular acid known in the literature by that name, and believed to be represented by the structural formula presented herein.

What I claim and desire to protect by Letters Patent is:

1. As new compositions of matter compounds derived from dehydroabietic acid having the following general formula:

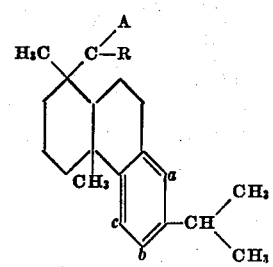

in which A is selected from the group consisting of O, S, H₂, NX, where X is selected from the group consisting of hydrogen and a monovalent organic radical; R is selected from the group consisting of OH, SH, O-metal, O-NH₄, halogen, OX, SX, NXX, where X is selected from the group consisting of hydrogen and a monovalent organic radical, and in which at least one of "*a*," "*b*" and "*c*" is selected from the group consisting of SO₃H and SO₃-metal.

2. As a new composition of matter, a sulfonated dehydroabietic acid.

3. As a new composition of matter, mono-sulfodehydroabietic acid.

4. As a new composition of matter, a salt of mono-sulfodehydroabietic acid.

5. As a new composition of matter, a sodium salt of mono-sulfodehydroabietic acid.

6. The method of producing a sulfonic acid derivative of a dehydroabietic acid compound containing the hydrocarbon nucleus of dehydroabietic acid which includes treating the said compound with a sulfonating agent and separating the sulfonic acid from the mixture.

7. The method of producing a sulfonic acid derivative of a dehydroabietic acid compound containing the hydrocarbon nucleus of dehydroabietic acid which includes treating the said compound with sulfuric acid and separating the sulfonic acid from the mixture.

8. The method of producing a sulfonic acid derivative of a dehydroabietic acid compound containing the hydrocarbon nucleus of dehydroabietic acid which includes treating the said compound with chlorosulfonic acid.

EDWIN R. LITTMANN.